US008825545B2

(12) United States Patent
Grinberg et al.

(10) Patent No.: US 8,825,545 B2
(45) Date of Patent: Sep. 2, 2014

(54) SYSTEM AND METHOD FOR FACILITATING ON-LINE PAYMENT

(75) Inventors: Alexander Grinberg, North Sydney (AU); Michael Kontorovich, North Sydney (AU); Colin Reyburn, North Sydney (AU); Mark Chazan, North Sydney (AU)

(73) Assignee: Ewise Systems Pty Ltd. (AU)

( * ) Notice: Subject to any disclaimer, the term of this patent is extended or adjusted under 35 U.S.C. 154(b) by 522 days.

(21) Appl. No.: 10/561,699

(22) PCT Filed: Jun. 25, 2004

(86) PCT No.: PCT/AU2004/000846
§ 371 (c)(1),
(2), (4) Date: May 15, 2006

(87) PCT Pub. No.: WO2004/114168
PCT Pub. Date: Dec. 29, 2004

(65) Prior Publication Data
US 2007/0100770 A1    May 3, 2007

(30) Foreign Application Priority Data
Jun. 25, 2003  (AU) ................................ 2003903229

(51) Int. Cl.
| G06Q 40/00 | (2012.01) |
| G06Q 20/26 | (2012.01) |
| G06Q 20/12 | (2012.01) |
| G06Q 20/38 | (2012.01) |
| G06Q 20/10 | (2012.01) |
| G06Q 20/04 | (2012.01) |
| G06Q 30/04 | (2012.01) |

(52) U.S. Cl.
CPC ................ *G06Q 30/04* (2013.01); *G06Q 20/26* (2013.01); *G06Q 20/12* (2013.01); *G06Q 20/382* (2013.01); *G06Q 20/10* (2013.01); *G06Q 20/04* (2013.01)
USPC ............................................. 705/39; 705/26.1

(58) Field of Classification Search
CPC .................................................... G06Q 20/027
USPC .......................................................... 705/39
See application file for complete search history.

(56) References Cited

U.S. PATENT DOCUMENTS 5,590,197 A * 12/1996 Chen et al. ...................... 705/65
5,815,657 A    9/1998 Williams et al.
(Continued)

FOREIGN PATENT DOCUMENTS

EP    1 017 030    7/2000
EP    1017030      7/2000
(Continued)

*Primary Examiner* — Eric T Wong
(74) *Attorney, Agent, or Firm* — Seyfarth Shaw LLP

(57) ABSTRACT

The present invention relates to a system and method for facilitating on-line payment particularly for goods or services purchased via a merchant site on the Internet.

The system enables payment from an existing customer account at a financial institution, but does not require the user to provide credit card details. The payment is implemented in real-time from the customer account to a merchant account via a financial institution application such as an Internet banking website.

An interface is provided which is initiated via the merchant site and which then interfaces the customer computer to the financial application having access to the customer computer's account. The customer can then enter payment details directly with the financial institution to pay the merchant directly for the transaction.

10 Claims, 9 Drawing Sheets

(56) References Cited

U.S. PATENT DOCUMENTS

| | | | |
|---|---|---|---|
| 5,963,924 | A | 10/1999 | Williams et al. |
| 6,138,107 | A | 10/2000 | Elgamal |
| 6,327,578 | B1 * | 12/2001 | Linehan .................. 705/65 |
| 7,634,445 | B1 * | 12/2009 | Langer et al. ............. 705/40 |
| 2002/0072942 | A1 * | 6/2002 | Kuykendall et al. ........ 705/7 |
| 2002/0077978 | A1 * | 6/2002 | O'Leary et al. ........... 705/40 |
| 2002/0087467 | A1 | 7/2002 | Mascavage, III et al. |
| 2003/0093367 | A1 | 5/2003 | Allen-Rouman et al. |
| 2003/0154164 | A1 * | 8/2003 | Mascavage et al. ........ 705/39 |
| 2004/0148252 | A1 * | 7/2004 | Fleishman ............... 705/39 |
| 2006/0242058 | A1 | 10/2006 | Torto |

FOREIGN PATENT DOCUMENTS

| | | | | |
|---|---|---|---|---|
| EP | 1 134 707 | | 9/2001 | |
| EP | 1 280 115 | | 1/2003 | |
| EP | 1280115 | A2 | 1/2003 | |
| JP | A 11-102404 | | 4/1999 | |
| JP | A 2001-216461 | | 8/2001 | |
| JP | A 2002-528819 | | 9/2002 | |
| JP | A 2002-543541 | | 12/2002 | |
| JP | A 2003-501725 | | 1/2003 | |
| JP | A 2003-508838 | | 3/2003 | |
| WO | WO 00/33221 | | 6/2000 | |
| WO | WO 00/33221 | A1 | 6/2000 | |
| WO | WO 00/67219 | | 11/2000 | |
| WO | WO 00/67219 | A1 | 11/2000 | |
| WO | WO 01/11515 | | 2/2001 | |
| WO | WO 01/54015 | | 7/2001 | |
| WO | WO0180100 | A1 * | 10/2001 | |
| WO | WO 02/25604 | | 3/2002 | |
| WO | WO 02/25604 | A1 * | 3/2002 | ........... G07F 7/08 |
| WO | WO 02/39400 | A2 * | 5/2002 | ........... G07F 19/00 |
| WO | WO 02/065352 | A1 | 8/2002 | |
| WO | WO02/086829 | * | 10/2002 | ........... G07F 19/00 |

* cited by examiner

Price Buster DVD's (Pty) Ltd.

Select a payment method
Please enter your payment details below. We accept all major credit cards as well as Direct Payments from your chosen bank account through the eWISE PAY 3P SYSTEM which gives you the flexibility of paying for your purchase directly from your account or through BPay with a single click. Since the transaction is processed directly from your bank's online banking website there is no disclosure of any of your information through to any third party.

Payment Method

○ Visa™   Credit Card No. [ ]   Expiration Date 01 / 2002   Cardholder's Name [ ]

◉ eWISE PAY 3P

Payment Type:
- Westpac™ - Pay Anyone - Direct Debit
- Westpac™ - Pay Anyone - Direct Debit
- Westpac™ - BPay
- ANZ™ - Pay Others
- CommBank™ - Pay Others Biller Code: 55723   ce: aue33917762

[Pay]

| | | | | | | Date: 28 February 2003 | | |
|---|---|---|---|---|---|---|---|---|

Westpac Business Banking

Payment Gateway

Payment History
This is a list of all bills you marked as paid

| Amend | Item by | Biller Code | Biller Name | Reference | Paid Via | Comment | Amount Paid | Date Paid | Receipt No. |
|---|---|---|---|---|---|---|---|---|---|
| Amend | ☐ | 7322229-545432 | MR WAYNE FOX | aue33917762 | Westpac Classic Account 5 | Paid Price Buster DVD's from Westpac Classic Account 54 via BSB transfer | $162.87 | 21/02/2003 | From: testWm1 To: testDm2 |
| Amend | ☐ | 7322229-545432 | MR WAYNE FOX | aue33917762 | Westpac Classic Account 54 | Paid Price Buster DVD's from Westpac Classic Account 54 via BSB transfer | $162.87 | 21/02/2003 | From: testWm1 To: testDm2 |
| Amend | ☐ | 7322229-545432 | MR BILBO BAGGINS | aue33917762 | Westpac Please select an account | Paid Price Buster DVD's from Westpac Please select an account via BSB transfer | $162.87 | 21/02/2003 | From: testWm1 To: testDm2 |
| Amend | ☐ | 7322229-545432 | MR BILBO BAGGINS | aue33917762 | Westpac Please select an account | Paid Price Buster DVD's from Westpac Please select an account via BSB transfer | $162.87 | 21/02/2003 | From: testWm1 To: testDm2 |
| Amend | ☐ | 7322229-545432 | MR MARK CHAZAN | aue33917762 | Westpac Classic Account 81 | Paid Price Buster DVD's from Westpac Classic Account 81 via BSB transfer | $162.87 | 21/02/2003 | From: testWm1 To: testDm2 |

SYSTEM AND METHOD FOR FACILITATING ON-LINE PAYMENT

This application is a U.S. National Phase of International Patent Application Ser. No. PCT/AU2004/000846, filed Jun. 25, 2004 which claims priority to Australian Patent Application No. 2003903229 filed Jun. 25, 2003.

FIELD OF THE INVENTION

The present invention relates to a system and method for facilitating on-line payment and particularly, but not exclusively, to a system and method for facilitating on-line payment for goods and/or services purchased via a network based merchant site.

BACKGROUND OF THE INVENTION

One of the major barriers to user uptake of on-line shopping is the lack of or at least perceived lack of security in relation to the provision of payment details, such as credit card numbers, to merchant sites. There is such a reluctance to provide credit card or debit card details to merchants that surveys carried out in relation to on-line shopping have determined that anywhere between 25% and 75% of customers abandon their "shopping carts" without completing purchase.

There are other reasons for non-completion of purchase apart from customers not trusting merchant sites with their credit card details. These include the fact that not all on-line consumers have credit cards, and, for those with credit cards, credit limits may have been reached.

Customer initiated direct debit is known for on-line payment of bills, such as utility bills, and for recurring payments, but the sites need prior standing authority from the user, usually organized through off-line mechanisms. Without this explicit authority no third parties, such as merchants, are able to access funds from the customer. Such an arrangement is tedious and inconvenient to set up. In any event, customers are extremely reluctant to give authority to a third party to access their funds and there are concerns about fraud and difficulty in cancelling such an authority.

Presently, there is no mechanism for enabling direct payment from a customer's usual account, such as a bank account, to a merchant's account, during an on-line product transaction initiated from a merchant's site.

These difficulties give rise to a low rate of uptake of on-line merchandising.

SUMMARY OF THE INVENTION

In accordance with a first aspect, the present invention provides a system for facilitating on-line payment for an on-line product transaction, comprising an interface means which is arranged to be initiated via a merchant site and is arranged to provide a connection to a financial institution application to enable processing of the payment, via the financial institution application, to a merchant account, the financial institution application requiring a security means to enable processing of the payment, the connection being implemented to enable the security means to be obtained via a customer computing system.

By "on-line payment" is meant any payment which is initiated over a network connection. By "on-line product transaction" is meant any transaction for a product which occurs over a network connection. A network may be any computing system or telephony network. "Computing system network" includes any network of computing devices. "Computing devices" include conventional computers, PCs, laptops, and mobile communications devices such as mobile telephones, personal digital assistants, and any computing system which is connectable to a network.

A "product transaction" is a transaction for any product, which may include goods and/or services.

A "merchant site" is a computer network site provided by a computing system which is connectable to the network to offer products for sale via the network to customers. A "financial institution application" may include any application operated by a financial institution, such as a bank or other account providing authority. The financial institution application will be usually provided by a financial institution computing system which is connectable to the network to make available the financial institution application.

A typical computer network on which on-line product transactions take place is the Internet. The Internet offers many merchant sites which can be browsed by customers to enable customers to determine whether they wish to purchase a product. The present invention is not, however, limited to application on the Internet only. It may be applied to any computer network where products are sold on-line and with the facility to connect to financial institution systems.

Preferably, the interface means enables the payment to proceed in "real time". This preferably enables payment to occur during the product transaction.

Payment may be by way of any stored valued methodology eg. money, loyalty points, etc.

Preferably, the interface means is arranged to be initiated via the merchant site via a customer operating a customer computing system.

Preferably, the interface means is arranged to generate confirmation to a merchant system that payment has occurred. Preferably, the confirmation enables the merchant system to complete the product transaction. Preferably, the system is arranged to establish a connection with the financial institution computing system for generation of confirmation that payment has occurred. Preferably the connection is established between the merchant site and the financial institution computing system. Preferably the connection is a secure connection. This advantageously avoids fraudulent generation of confirmation of payment, therefore reducing the chances of fraud and assuring the merchant that the confirmation is generated by the financial institution computing system.

Preferably, the interface means is arranged to obtain details of the transaction and provide those details to the financial institution application to enable payment. Preferably, the transaction details include the amount of payment. Preferably, the transaction details include information which may be required to identify the transaction. For example, the transaction details may include a merchant account identifier.

In one embodiment, the interface means is arranged to interface with known pre-existing financial institution applications. These include financial institution applications provided by so-called "Internet banking" sites.

Financial institution applications usually require a security means to be entered to enable operation to carry out processes such as payment by a customer (who may hold an account with the financial institution) to third party accounts. In one preferred embodiment, the interface means interfaces a customer's computing system to the financial institution application to enable the customer, who is facilitating the transaction at the merchant site, to enter their security means (which may be a password, PIN or any other type of security means).

In an alternative embodiment, the system for facilitating on-line payment includes an agent application which is arranged to automatically enter the security means to the institution application. The agent application is preferably arranged to obtain the security means from a customer computing system, the security means being stored in a storage location accessible by way of the customer computing system. Preferably, the security means is stored in encrypted form. The agent application is preferably arranged to obtain the decryption key for the customer's encrypted security means, to enable decryption of the security means. The agent application may operate in a similar manner to that of the active content agents described in the applicant's pending international patent application, no. PCT/AU02/00150, filed on 14 Feb. 2002. Disclosure of this document is incorporated herein by reference.

The system is preferably arranged to store a record of transaction details for a transaction.

The system preferably further includes a database arranged to store transaction details of transactions. This database may be accessible by merchants and/or customers in order to enable them to monitor the history of transactions they have carried out via the system.

Preferably, the system of the present invention may be used to facilitate payment for a transaction from a debit or credit account of a customer to a designated account of a merchant.

In at least a preferred embodiment, the system of the present invention provides the advantages that a customer accessing a merchant site and wishing to purchase a product, can make payment for that product in "real time". In the preferred embodiment, the interface means connects the customer system to a designated financial institution application which enables the customer (under control of the interface means) to make payment from customer account (e.g. a standard cheque account available on-line) to a designated merchant account. The system then confirms to the merchant that payment has been made so that transaction can proceed (e.g. delivery of the product can be authorized). In one embodiment, as discussed above, a secure connection is made between the merchant site and the financial institution computing system for confirmation that payment has been made to the merchant.

In at least the preferred embodiment, the transaction payment is carried out under the control of the customer who is paying. The customer does not have to give any security means (such as credit card information, account identification information, etc.) to any other third party, other than the financial institution that they usually deal with (by way of the financial institution application). No passwords or credit card numbers need to be given to merchants that the user may not trust. The merchant, in turn, has the comfort of being aware that payment has occurred before he delivers his product.

In accordance with a second aspect, the present invention provides a method for facilitating on-line payment for a transaction between a customer and a merchant, comprising the steps of, during a transaction via an on-line merchant site, accessing a financial application and making the financial application available to enable a payment from a customer's account to an account of the merchant, the financial institution application requiring a security means to enable processing of the payment, the method comprising the further step of obtaining the security means via a customer computing system.

Preferably, the method comprises the further step of operating the financial application to make the payment.

In accordance with a third aspect, the present invention further provides a computer program arranged to control a computing system to implement a system in accordance with the first aspect of the present invention.

In accordance with a fourth aspect, the present invention provides a computer readable medium providing a computer program in accordance with the third aspect of the present invention.

A further aspect of the present invention may relate to on-line payment of transaction such as bills, and peer to peer payment.

In accordance with a sixth aspect, the present invention provides a system for facilitating on-line payment, the system comprising an interface means which is arranged to be initiated via a system message and is arranged to provide connection to a payment means to enable processing of the payment.

A system message may be any message which can be transmitted via a network. Preferably, the system message is an e-mail message.

In a preferred embodiment, therefore, one party may send an e-mail message to another party, the e-mail message indicating to the other party a requirement for payment. For example, the e-mail message may include a bill for utility service. The e-mail preferably includes a link which is enabled to connect the further party to a payment means, such as through a merchant site, to enable payment in response to the message.

In accordance with a seventh aspect, the present invention provides a method for facilitating on-line payment, comprising the steps of using a system message initiating payment for a transaction, to link a transaction payers computing device to a payment means to enable processing of the payment.

In accordance with an eighth aspect, the present invention provides a computer program including instructions for controlling a computing system to implement a system in accordance with the sixth aspect of the present invention.

In accordance with a ninth aspect, the present invention provides a computer readable medium providing a program in accordance with the eighth aspect of the invention.

BRIEF DESCRIPTION OF THE DRAWINGS

Features and advantages of the present invention will become apparent from the following description of an embodiment thereof, by way of example only, with reference to the accompanying drawings, in which.

DESCRIPTION OF THE PREFERRED EMBODIMENT

A system and method in accordance with one embodiment of the invention will now be described with reference to the accompanying drawings.

The system and method of this embodiment of the invention facilitate on-line transactions. By "on-line transactions" is meant any transaction which occurs over any network. The example network used in the following description is the Internet. The invention may be applied in any network environment, and is not limited to application over the Internet.

Figure 1:
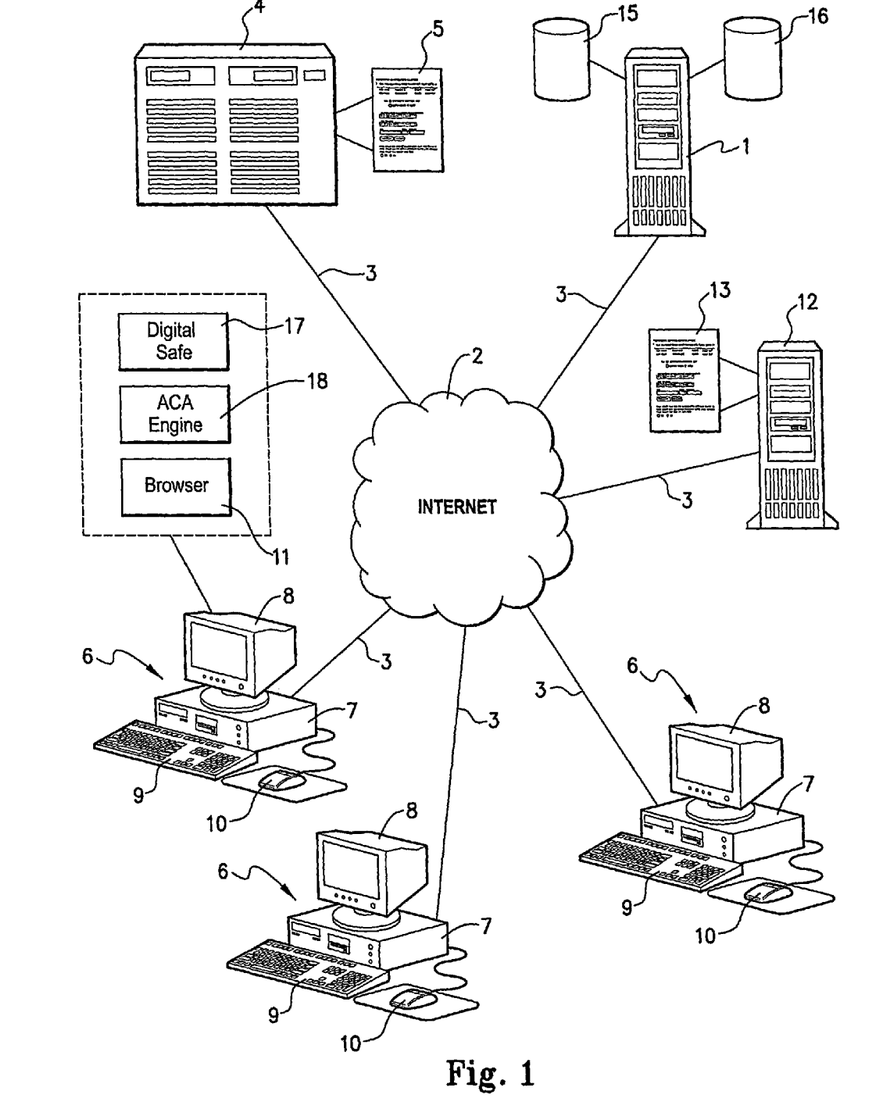
FIG. 1 is a schematic diagram for illustrating operation of a system in accordance with an embodiment of the present invention.

The system of this embodiment includes an interface means, which will be illustrated and described in detail later, and which in this example is implemented by an appropriate server computing system 1 which is connected to the Internet 2 via appropriate communication means 3. The interface means in this example includes software which is arranged to be made available over the network by the server computer 1.

Also illustrated in FIG. 1 is a merchant computing system 4. The merchant computing system 4 may include any appropriate type of server computing system 4 which is arranged to serve Web pages 5 on the Internet 2, in order to provide a merchant site where, for example, products may be offered for sale. In the illustration a single merchant system 4 is shown. This merely serves as an illustrative example of many existing merchant computing systems arranged for connection to the Internet 2. The present invention may be implemented via any suitable merchant system, and is likely to be implemented on many merchant systems. The merchant system 4 is arranged to serve web pages 5, to provide a website via which information on products (including goods and/or services) may be accessed and via which products may be purchased in a known manner. In accordance with this embodiment of the invention, the merchant computing system 4 is also arranged to operate with the interface means provided by the system 1.

Also shown in FIG. 1, are customer computing systems 6. The customer computing systems 6 may comprise any appropriate computing system including appropriate software and hardware and in this examplary embodiment are illustrated as being PCs including a computer 7, monitor 8, keyboard 9 and mouse 10.

The user computing systems 6 includes browser or other software 11 which is arranged to enable the computing system 6 to browse or access Web pages over the Internet 2, such as Web pages 5 provided by the merchant system 4. Browsers are known.

In FIG. 1, three user computing systems 6 are shown. This is for illustrative purposes only. As is well known, there are many customer computing systems which are arranged for connection to networks such as the Internet, so that, for example, customers can browse various merchant sites. (as well as other Web pages) in order to select products for purchase. This embodiment of the present invention may be implemented for many customer computing systems and many customers.

Conventionally, when a customer accesses the Internet to view a merchant site, their browser brings up the appropriate Web page and the user studies the Web page(s) and selects an appropriate product (by way of a "shopping basket") for purchase. In order to proceed with the purchase, the customer must then provide payment details to the merchant site. This is most usually done by way of providing credit card details. As discussed above, many people are reluctant to provide their credit card details to merchant sites.

The majority of customers keep accounts with financial institutions, such as banks. The majority of financial institutions offer services which are available on-line. These services may include access to a customer's account records. They may also include facilities which enable a customer to pay third parties directly from their account. For example, the financial institution may offer an on-line financial application which enables a customer to pay from their account to a third party whose account details, or some account identification of the third party, are provided to the application. The third party's account details or identification may include account number, which financial institution the third party holds the account with, and other required details.

In FIG. 1, a server computing system 12 of the financial institution is illustrated. The financial institution server computing system 12 is arranged to serve Web pages 13 to the Internet 2. Web pages 13 may enable operation of the financial applications for allowing access to customer account records and making account transfers, and other functions. Such applications are known.

Only a single financial institution server computer 12 is illustrated in the drawings. It will be appreciated that there may be many financial institutions arranged to serve Web pages for facilitating financial applications. The present invention may find use with many such financial institution applications, and the single server computer 12 is shown for illustrative purposes only.

The system of this embodiment of the present invention includes an interface means, which in this embodiment is in the form of a software application provided by server computing system 1. The interface means operates to connect to the financial institution application provided by the financial server computer 12, to enable payment to an account of a merchant associated with the merchant system.

In this embodiment, the system 1 of the present invention also includes a transaction record database 15 for storing records of transactions occurring via the system 1 and also a decryption key database 16 which stores decryption keys for decrypting encrypted customer security means and which will be described in more detail later. The system 1 of the present invention may be implemented by any appropriate computing hardware and software. Although databases 15 and 16 are shown separately, they may be implemented by combined hardware/software.

The customer computing system 6 also may include software in the form of a digital safe 17 and an "active content agent" engine 18. The function of these will be described in more detail later.

Operation of an embodiment of the present invention will now be described by way of illustrative example with reference to the example computer screen displays of FIGS. 4 through 7. The example screen displays have MICROSOFT® toolbar layouts and "look and feel". The present invention is not limited to this format any appropriate format may be used. Please note that where brand names and trade marks are shown in the drawings, they are for example purposes only and are in no way limiting to the invention.

The example computer screen display shown in FIGS. 2 through 7 are the displays which will appear on a customer system 6 monitor 8.

With reference to the Figures, the customer computer 6 accesses a merchant site provided by Web pages 5 supported by merchant computing system 4. In this illustration, the merchant site offers for sale digital video discs (DVDs). The customer browses the merchant site and may select one or more DVDs for purchase. The customer then proceeds to a "payment" page on the merchant site, the payment page 20 being illustrated in FIG. 2. The payment page displays the merchant brand name 21 (in this case Price Buster DVD's (Pty) Ltd). The payment page 20 also directs 22 the customer to select a payment method. The payment methods available on payment page 20 include the conventional payment method of paying by credit card 23. It also includes the option 24 of paying the merchant by way of the payment system and method in accordance with an embodiment of the present invention. The payment method 24 is labeled with the brand name "eWise Pay 3P" 25. This is a brand name only. Any brand name or any other designation of a payment method may be utilised. A drop-down menu 26 is available for selecting a financial institution application to facilitate payment to the merchant.

Figure 2:
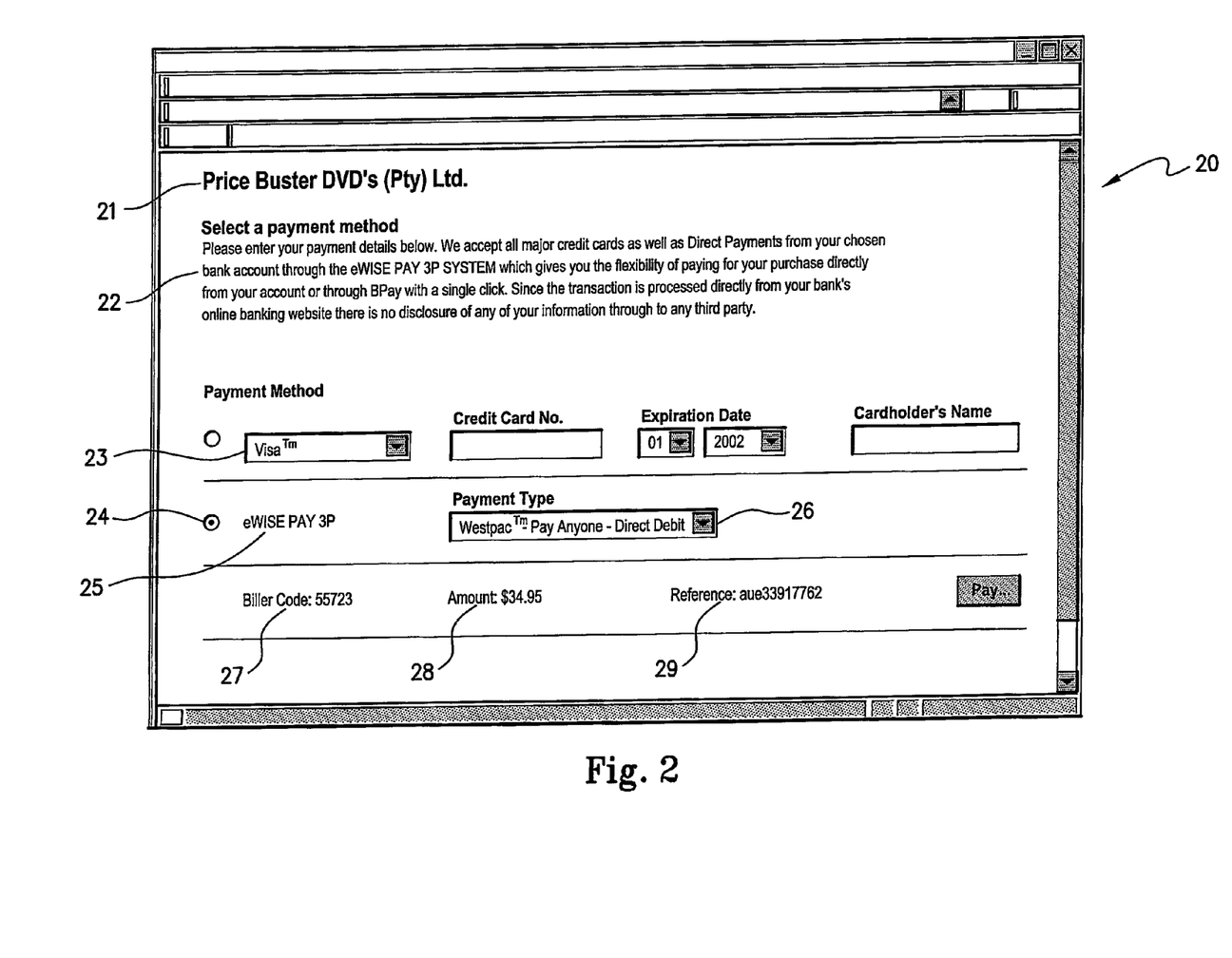
FIGS. 2 through 7 are example computer screen displays for illustrating operation of an embodiment of the present invention.

The page also includes a "Biller Code" 27, and "Amount" 28 and a transaction "Reference" 29. Some or all of this information may or may not be shown on the page 20. For example, in an alternative embodiment, the Biller Code 27 may not be shown, and instead may be stored and retrieved from a database.

The amount 28 is the amount that the customer needs to pay to the merchant.

Figure 3:
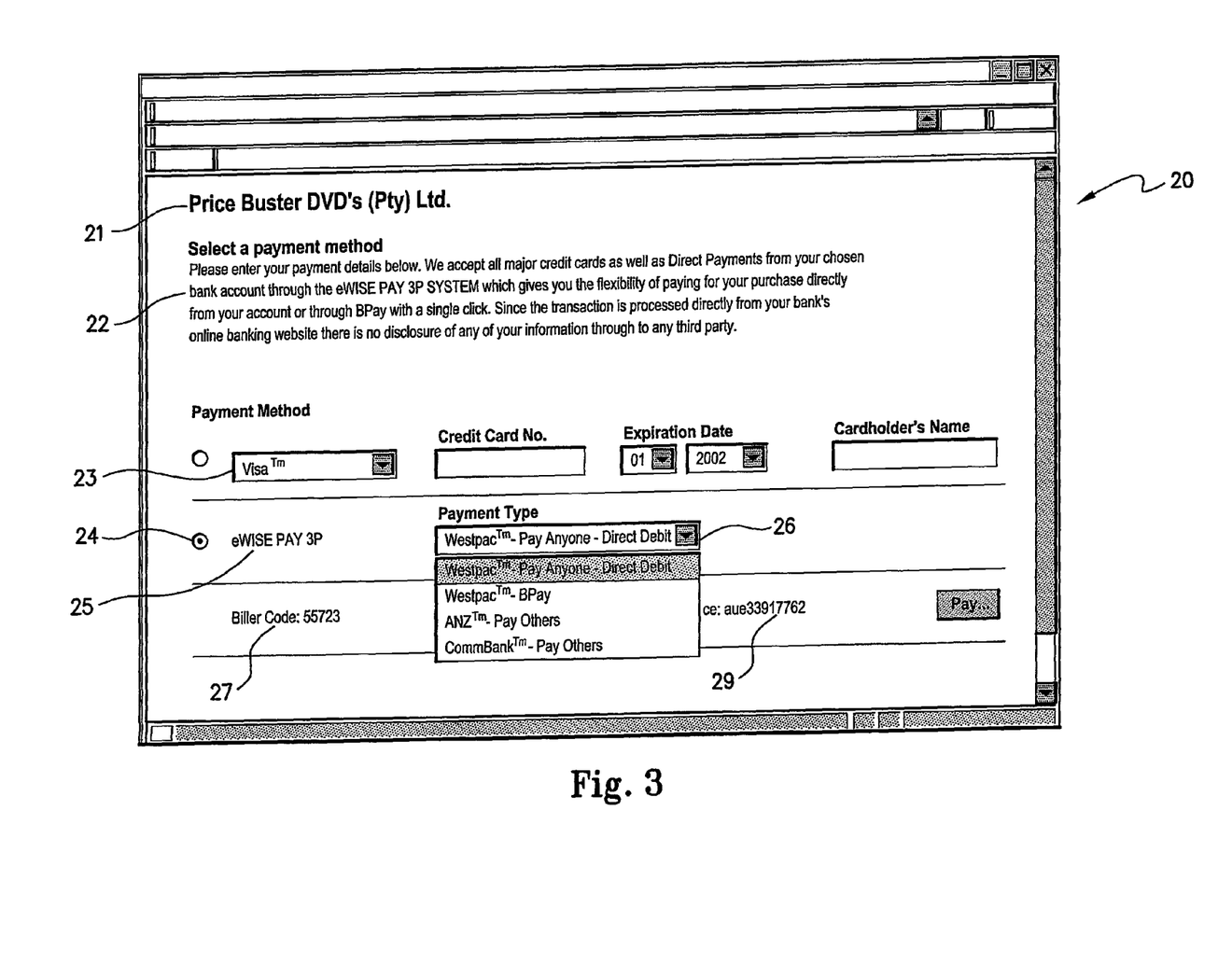

FIG. 3 is a further view of the payment page 20, showing details of the drop-down menu 26. It is clear from this that there are a number of financial institution applications (in this case four) available for the customer to select. Note that any number of financial applications may be provided for selection. This will depend upon the number of financial institution applications that the present invention is authorized for use with and also the number of the financial institution applications which may be available.

Figure 4:
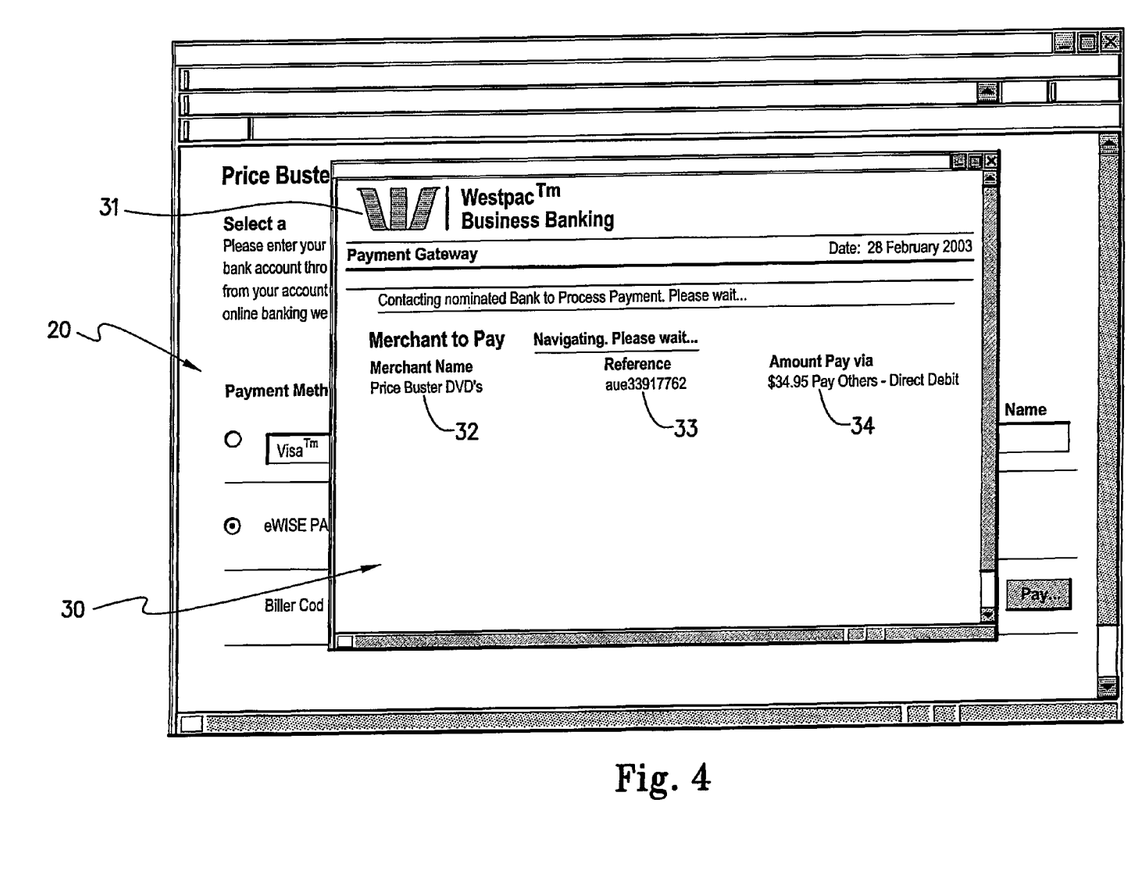

The customer selects one of the financial institution applications 26 for payment to the merchant (the customer will usually select a financial institution application of a financial institution where they hold an account). The selection initiates operation of the system 1 of the present invention. The system 1 provides a "payment gateway" display 30 (FIG. 4). The payment gateway 30 opens in a separate browser window on the user computer 6 (note that it may open in the same browser window). The page 30 is served by the system 1 in accordance with the present invention. Note that the payment gateway display 30 displays branding 31 of the financial institution deploying the system. Whether or not this branding is displayed is optional.

Other information may also be displayed in the payment gateway 30 page. Shown in FIG. 4 is the "Merchant Name" 32, a "Reference" 33 and a payment amount 34. The "Amount Paid" information includes type of payment that would occur, in this particular example being a direct debit. Note that the further or alternative information may be included in the payment gateway page 30 as desired.

In this embodiment, the system 1 utilizes a software application in the form of a software agent in order to provide an interface to the financial institution application selected. Once the system 1 is initiated by selection of the payment method 24 and selection of the financial institution application, the software agent navigates the Internet 2 to locate the financial institution system 12 and website 13 served by the financial institution system. The software agent then connects the customer computer 6 to the website of the financial institution, so that the customer can connect to the financial institution application. In this embodiment, the agent application is also arranged to extract payment details from the merchant system and provide those payment details to the financial institution application.

Figure 5:
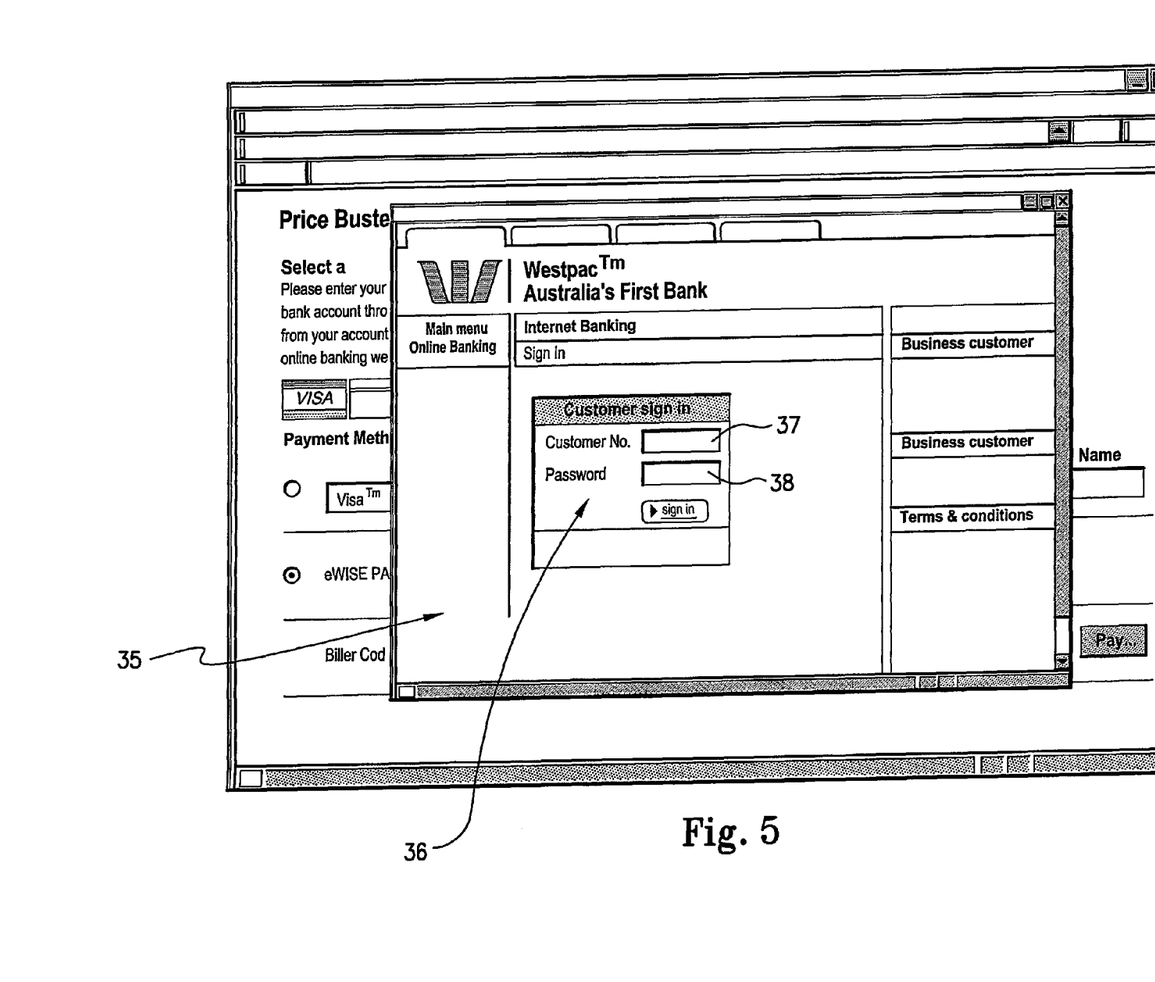

When the agent application has navigated to the financial institution system 12 the appropriate Web page 13 is served to the customer computer system 6. FIG. 5 shows one example of an "Customer Sign In" page 35 provided by one particular financial institution application. This page includes some information (the information will depend on the financial institution application being accessed) and also a "Customer Sign In" section 36 requiring entry of a security means to enable access to the financial institution application. It is to be noted that the financial institution application is a pre-existing application. The agent application of this embodiment of the present invention has interfaced the customer computer 6 automatically to the pre-existing financial institution application without requiring any operation by the customer other than to select the financial institution application to be navigated to from the merchant site. Note that FIG. 5 gives one example only of a financial institution application, and the present invention may be used with any financial institution application.

The next step in the process is that the customer enters their security means to the Customer Sign In section. In this example the security means includes a Customer Number 37 and a Password 38. The security means may include any type of security means, depending upon the security means required by the financial institution application.

Note that in an alternative embodiment to be described later, the system of the present invention may automatically provide the security means to the financial institution application. In the illustrated embodiment, however, the customer provides the security means themselves.

No security means is provided to the merchant site. The customer instead provides the security means directly to the financial institution application. This is something that the customer is comfortable with doing. There is no potential for the merchant, therefore, to illicitly access the customer's account via the financial institution application. The payment to the merchant via the financial institution application is under the control of the customer and is separated from the merchant system.

Figure 6:
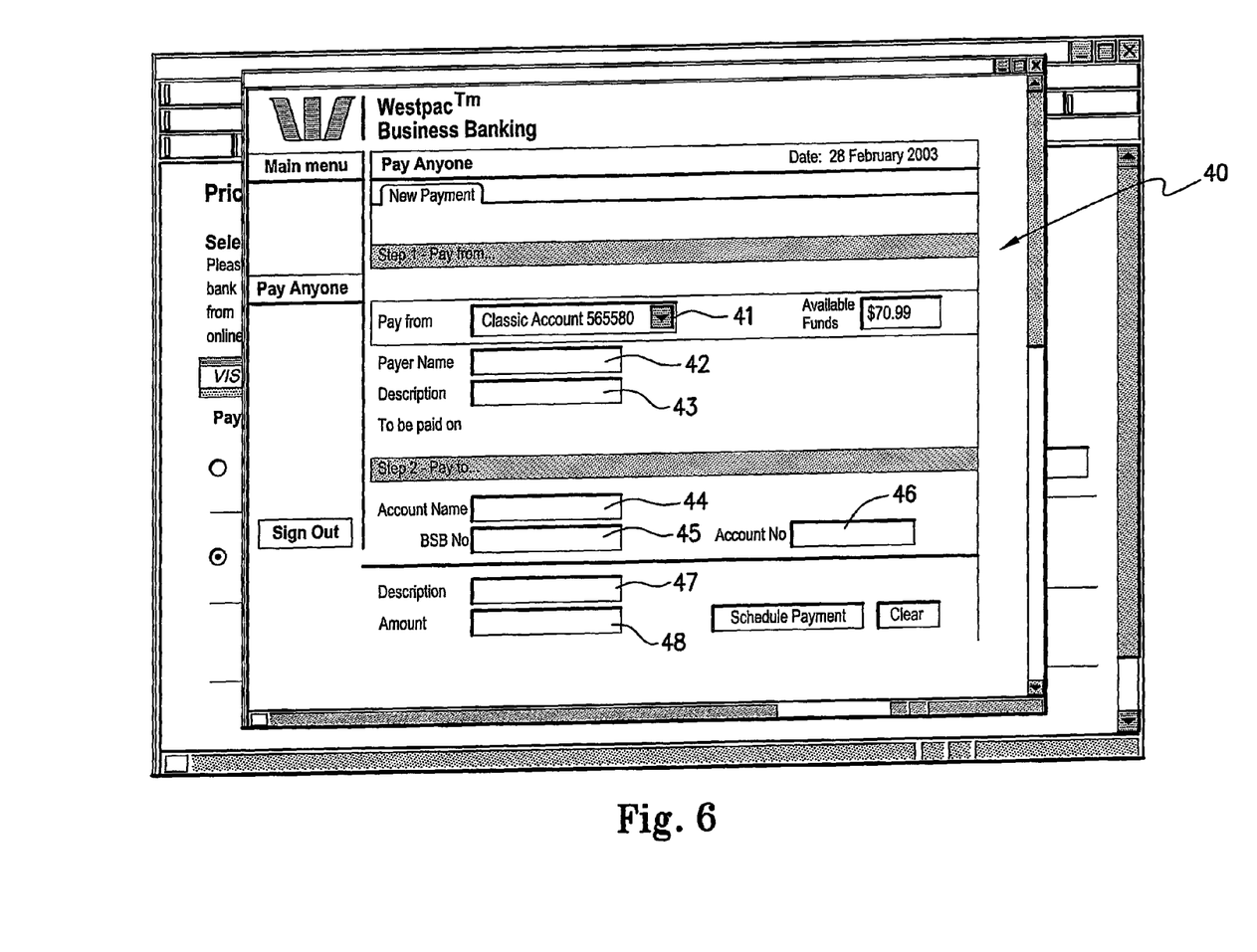

Once the security means have been entered, the financial institution application operates to enable payment to the merchant. The agent application automatically navigates the site to the appropriate page. Referring to FIG. 6, the page 40 is served to the customer computer 6 by the financial institution system 12. The page 40, in this example, enables entry of details for payment from an account the customer has with the financial institution, to an account of the merchant (which may be with the same financial institution or another financial institution). In this example, page 40 includes information such as the account "Pay From" 41, the "Payer Name" 42, a "Description" of what the payment is for 43. The page 40 also includes information relating to the merchant payment details, including the "Account Name" 44 of the merchant, the current identification information including in this example a "BSB Number" 45 and an "Account Number" 46. It also includes a "Description" 47, which in this case is the Reference 33 which appears in the merchant site as reference numeral 29 and on the payment gateway as reference numeral 33 and which identifies the transaction to the system 1 of the present invention. The information also includes an "Amount" to be paid.

In this embodiment of the invention, as discussed above the agent application obtains payment details from the merchant site. It may also obtain details of the payer either from the merchant site or the customer computer or a system database. In the example shown, the details obtained by the agent application are automatically entered into the financial institution application. These details include the Payer Name 42, the Description of the item 43, the Account Name of the merchant 44, the BSB Number 45, the Account Number 46, the Description 47 and the Amount 48. One advantage of having these details automatically entered into the financial institution application is that they will be accurate without any potential for customer error. Conventionally, a customer would enter the details via a user terminal 6, which can often result in error. The agent application is arranged to obtain the details that are relevant for the particular financial institution application. The agent application therefore operates by first detecting which financial institution is selected at the merchant site and then obtaining the details that it knows are required for that financial institution application from the merchant site and (if required) the customer computing system 6.

Note that the account of the customer 41 may be selected by the customer or may automatically be selected by the agent application based on information provided by the customer computer.

Note that this page and other pages may not be visibly displayed to the user in the case where it is fully automated by the agent.

Figure 7:
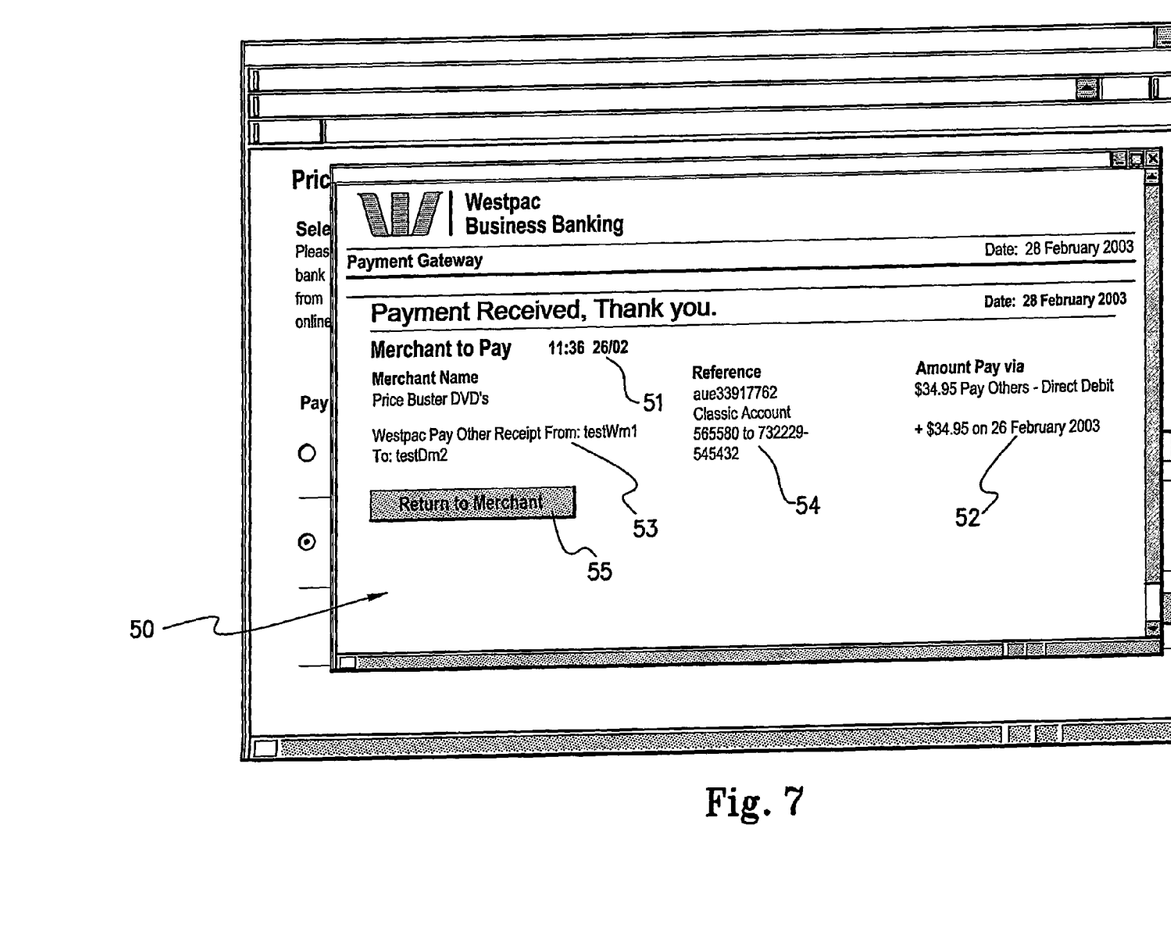

Following submission of the payment details and processing by the financial institution application of the payment to the merchant, the system 1 of the present invention produces a "Payment Received" page 50 (FIG. 7). This page is similar to the initial Payment Gateway page 30. It includes further details, however. In particular it includes a date and time 51 on which payment was made. It confirms 52 the amount of payment that was made and the date. It provides information on the receipt 53 which is provided by the system 1 to the merchant system 4. It also includes some further reference information 54 providing details of the account paid from and the financial institution receipt number that the agent extracted automatically from the financial institution site. The merchant therefore receives an official receipt of payment to their account of the required funds for the transaction. They can therefore organize delivery of the product to the customer in the comforting knowledge that they have already been paid. In one embodiment, the system implements a process to reduce or avoid the potential for provision of a fraudulent receipt to the merchant. In this embodiment, the customer system 6 transfers the relevant session information to the merchant server 4 before the financial institution system 12 issues the receipt page 50. The merchant system 4 then establishes its own Secure Socket Layer (SSL) session either directly with the financial institution system 12 or via the customer system 6, providing an end-to-end SSL session between the financial institution system 12 and the merchant system 4. SSL communication is known. The customer's existing session with the financial institution system 12 may be maintained. Because the merchant system 4 has a direct SSL session with the financial institution server 12, the merchant can be assured that the receipt information they are receiving is being provided by the financial institution not by a fraudulent process eg a fraudulent customer system.

The establishment of the additional/alternative communication channel between the merchant system 4 and the financial institution system 12 does not require that the customer disclose any of their authentication details to the merchant system 4.

In one embodiment, the payment confirmation details may be digitally signed by the financial institution. Where the financial institution digitally signs the payment confirmation, the system 1 of the present invention validates the signature to ensure validity before notification to the merchant.

Note that a "Return to Merchant" button 55 is provided for the customer's return to the merchant site.

Figure 8:
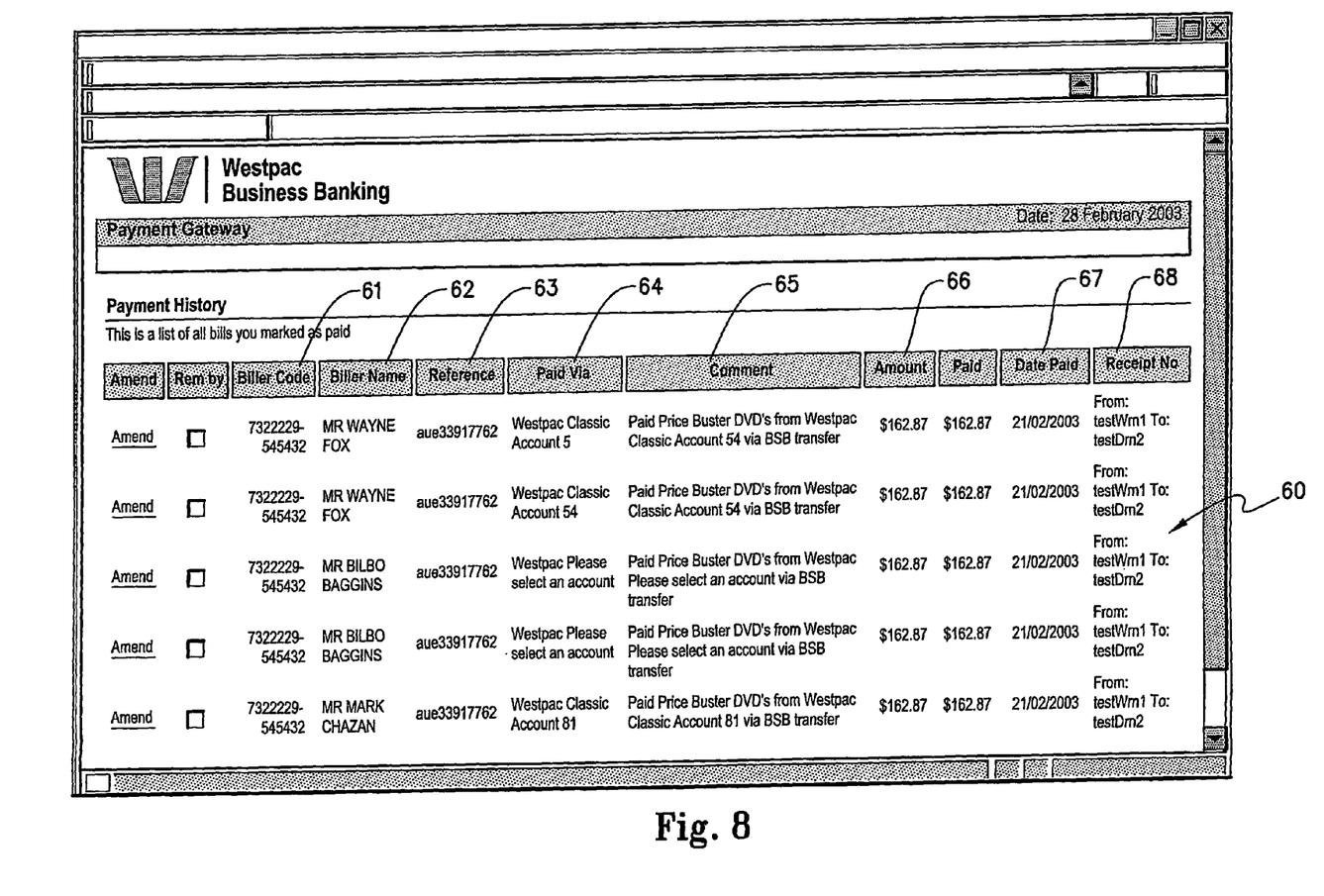
FIG. 8 is a an example computer screen display illustrating transaction data records which may be produced in accordance with an embodiment of the present invention.

FIG. 8 is an example computer display screen which may be viewed via a merchant system 4 and shows a records page 60 of transaction records stored in database 15 of the system 1. The system 1 serves the page 60 to the merchant system 4 so that the merchant can view the transaction records of the transactions that have occurred via the system 1.

The records may be represented in any convenient form on the page 60. In this example, the records include information such as "Biller Code" 61; "Biller Name" 62; "Reference" 63; "Account Paid Via" 64; "Comment" 70; "Amount Paid" 66; "Date Paid" 67, and the "Receipt Number" 68.

Records may also be provided for access by a customer computer server so that a customer can view transactions that they have paid via the system 1.

In the above embodiment, the customer is expected to remember and enter their own security means to enable access to the financial application (FIG. 5). In an alternative embodiment, the technology disclosed in the applicant's co-pending international application no. PCT/AU02/00150 may be employed to enable the agent application to automatically obtain the customer's security means and enter them to the financial institution application.

Referring to FIG. 1, in this alternative embodiment a customer computer system 6 includes software including a digital safe 17, and an ACA or "Active content Agent" engine 18. The digital safe 17 stores in encrypted form (using any suitable encryption technology) the security means of the user for enabling entry into the financial institution application. Database 16 at invention system 1 stores decryption keys for decrypting the encrypted security means in the digital safe 17.

In operation, the agent application which implements the interface to the financial institution application, is also arranged to obtain the security means 17 from the digital safe 17 of the customer computer 6. It does this by first determining the identity of the customer computer, then obtaining a decryption key from the database 16 which is arranged to decrypt the encrypted code in the digital safe 17. As part of the registration process, a customer would have their security means, such as passwords, encrypted by the system 1 and be provided with a password to enable access of the agent application to the decryption key 16 for the user computer 6 stored in the encryption key database 16. The customer may be required to enter a password to the gateway so that the agent application can then automatically obtain the security means for the financial institution application from the digital safe 17.

The ACA engine 18 determines whether the agent application is a correct agent application for the financial institution application and whether it is authorized to access the customer computer 6 for digital safe 17. The agent application may be provided with a digital certificate which the ACA engine can use for authorization. The ACA engine then executes the agent application insofar as it enables the agent application to access digital safe 17 and decrypt the requisite security means for the particular financial application. At the stage where the user is expected to enter their security means to the financial institution application (FIG. 5), this is automatically entered by the agent application. The rest of the process is then the same as with the above embodiment. Note that once the security means has been decrypted by the agent application, the decryption key is discarded and must be obtained again from the decryption database 16 for future operation.

Figure 9:
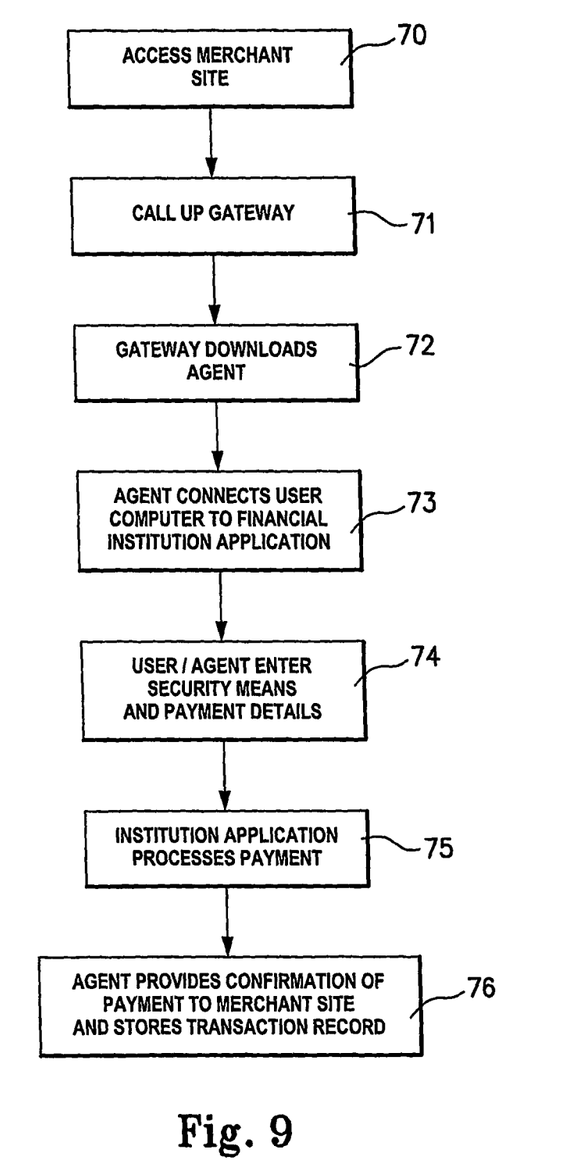
FIG. 9 is a flow diagram illustrating a process in accordance with an embodiment of the present invention.

FIG. 9 gives a summary flowchart of operation of the embodiment described above. At step 70, a customer accesses a merchant site. At step 71, the system of the present invention is operated and the payment gateway is called up onto the customer's computer. At step 72, the gateway implements operation of the agent application. At step 73, the agent application connects the user computer to the financial institution application that has been selected. At step 74, either the user or the agent enter the security means and payment details to the financial institution application. At step 75, the institution application processes payment. At step 76, the agent provides confirmation of payment to the merchant site and stores a transaction record in a database. As discussed above, the confirmation of payment to the merchant site may be made by secure connection between the merchant's system and the financial institution system.

The above description of the embodiment shows one particular implementation of the present invention. The invention is not limited to this particular implementation and may be implemented in a number of different ways. For example, the agent application described automatically fills in payment information to the financial institution website. This need not be the case. In an alternative embodiment the agent application merely connects the customer to the financial institution application arid the customer fills in the details. The agent then extracts the receipt and notifies the merchant of the completed payment. One advantage of the present invention is that the interface means can be adapted to interface with any pre-existing financial institution application. Advantage can therefore be taken of the fact that there are already many financial institution applications in existence which enable a user to pay third parties. The present invention is not limited to use with pre-existing financial institution applications, however. Financial institution applications may, for example, be designed specifically for use with the system and method of the present invention. The present invention may also, obviously, be used with financial institution applications that are designed subsequent to implementation of the present invention.

The computer display pages illustrated in the drawings are described in relation to the specification embodiment of one particular form. The invention is not limited to this form. Any appropriate form or format may be used with the present invention. Further, different information to that information shown in the specific embodiment may be utilized and illustrated in pages used with the present invention.

In the above description of the preferred embodiment, it is assumed the customers utilizing the invention will access the merchant sites from their own computing system. The present invention is not limited to this, however. There is potential for customers to access from any computing system which is connectable to the network.

In the above description of the preferred embodiment, the agent application and other components of the system are implemented by appropriate software supported by appropriate hardware. Any software/hardware mix that can implement the invention falls within the scope of the present invention.

In the above described embodiment, the financial institution system provides a website accessible by way of the Internet. The present invention is not limited to use with financial institutions that provide access to their applications by way of Internet websites. Other methods of connection from a network to the financial institution may be utilized with the present invention. For example, the system 1 of the present invention may in some cases have a direct connection to a financial institution, the direct connection being implemented when connection to a financial institution application is required. Further, the network is not limited to the Internet. The present invention may be implemented over any appropriate network.

Generally, the present invention provides interface means which is arranged to connect to a payment means so that the processing of payment to a merchant account can be carried out. In this, in at least a preferred embodiment, is without requiring any security means to be provided by the customer to the merchant.

In the above described embodiment, the customer account is a debit account. The present invention is not limited to use with a debit account. The account may be any type of account. For example, the account may be a credit card account, and the credit card details would be provided to the financial institution application for credit to the merchant.

In a variation of this invention, on-line payment may be facilitated without requiring that customer first access a merchant site. In this variation, peer to peer payments can be facilitated and bill payments can be facilitated. Implementation is similar to the implementation discussed above in relation to first embodiment of the present invention. Instead of initiation of the payment being by way of merchant site, however, initiation is via a system message. The system message may be an e-mail message. A customer receives an e-mail message, and the e-mail message contains a link to the system gateway such as described in FIG. 4 of the drawings. The difference here is that the link is in the e-mail message and not at the merchant site, but otherwise operation is similar. Details of the person who is to be paid may be exacted from the e-mail or a system database.

The person who is to be paid may be anybody. It could a utility provider, for example, sending out a utility bill. It may be another person merely requiring payment into their account from the payer.

Modifications and variations as would be apparent to a skilled addressee are deemed to be within the scope of the present invention.

The invention claimed is:

1. An online payment process comprising:
a transaction computing system initiating a payment gateway accessible by a customer computing system responsive to a customer purchase selection received by a merchant website,
the transaction computing system receiving an institution selection from the customer computing system that designates a financial institution for payment of a purchase fee defined by the merchant website and connecting the customer computing system directly to a computing system controlled by the designated financial institution via the payment gateway responsive to the institution selection,
the payment gateway facilitating transfer of a security device directly from the customer computing system to a financial institution application hosted by the financial institution controlled computing system to authenticate the customer computing system, and automatically transferring payment data from the merchant website to the financial institution application,
the payment gateway interfacing the customer computing system with the financial institution application and making accessible to the customer computing system an account interface provided by the financial institution application to facilitate direct customer control of the payment process, including selection of a customer controlled account from a plurality of customer controlled accounts made available to the customer computing system by the financial institution application responsive to authentication of the customer computing system via the security device, the account selection designating, for payment of the purchase fee, a customer controlled account maintained by the financial institution,
the transaction computing system receiving payment confirmation from the financial institution controlled computing system following transfer of the purchase fee from the designated financial institution directly to an account specified by the merchant website in the payment data and automatically transferring the payment confirmation to the merchant website without intervention from the customer computing system.

2. The process of claim 1 comprising the payment gateway facilitating authorization of payments by the customer computing system from the selected customer controlled account to an account specified by the merchant website in the payment data via the financial institution application, the payment authorization authorizing the financial institution to transfer the purchase fee directly from the selected customer controlled account to the account specified by the merchant website.

3. The process of claim 2 comprising the transaction computing system transferring payment authorization from the customer computing system to the financial institution controlled computing system and payment confirmation from the financial institution controlled computing system to the merchant website in real-time.

4. The process of claim 1 comprising the payment gateway making accessible to the customer computing system a plurality of banking accounts that the customer maintains with the financial institution and an account balance for each of the customer banking accounts that represents the funds available from the respective account responsive to authentication of the customer computing system, the banking accounts and the account balances for each of the banking accounts being displayed within a banking interface controlled the financial institution application and made available to the customer computing system via the payment gateway.

5. The process of claim 1 comprising the transaction computing system initiating a dedicated financial institution active agent gateway that connects the customer computing system directly to an online banking interface provided by the financial institution application responsive to an institution selection from the customer computing system.

6. An online payment system comprising:
a transaction computing system having a processor and memory containing instructions that are executable by the processor to initiate a payment gateway accessible by a customer computing system via a data network responsive to a customer purchase selection received by a merchant website,
the instructions being executable to cause the transaction computing system to receive an institution selection from the customer computing system that designates a financial institution for payment of a purchase fee defined by the merchant website and connect the customer computing system directly to a computing system controlled by the designated financial institution via the payment gateway responsive to the institution selection,
the payment gateway being configured to facilitate transfer of a security device directly from the customer computing system to a financial institution application hosted by the financial institution controlled computing system to authenticate the customer computing system, and automatically transfer payment data from the merchant website to the financial institution application,
the payment gateway being configure to interface the customer computing system with the financial institution application and make accessible to the customer computing system an account interface provided by the financial institution application to facilitate direct customer control of the payment process, including selection of a customer controlled account from a plurality of customer controlled accounts made available to the customer computing system by the financial institution application responsive to authentication of the customer computing system via the security device, the account selection designating, for payment of the purchase fee, a customer controlled account maintained by the financial institution,
the instructions being executable to cause transaction computing system to receive a payment confirmation from the financial institution controlled computing system following transfer of the purchase fee from the designated financial institution directly to an account specified by the merchant website in the payment data and automatically transfer the payment confirmation to the merchant website without intervention from the customer computing system.

7. The system of claim 6 wherein the payment gateway is configured to facilitate authorization of payments by the customer computing system from the selected customer controlled account to an account specified by the merchant website in the payment data via the financial institution application, the payment authorization authorizing the financial institution to transfer the purchase fee directly from the selected customer controlled account to the account specified by the merchant website.

8. The system of claim 7 wherein the instructions are executable to cause the transaction computing system to transfer payment authorization from the customer computing system to the financial institution controlled computing system and payment confirmation from the financial institution controlled computing system to the merchant website in real-time.

9. The system of claim 6 wherein the payment gateway is configured to make accessible to the customer computing system a plurality of banking accounts that the customer maintains with the financial institution and an account balance for each of the customer bank accounts that represents the funds available from the respective account responsive to authentication of the customer computing system, the banking accounts and the account balances for each of the banking accounts being displayed within a banking interface controlled the financial institution application and made available to the customer computing system via the payment gateway.

10. The system of claim 6 wherein the instructions are executable to cause the transaction computing system to initiate a dedicated financial institution active agent gateway that connects the customer computing system directly to an online banking interface provided by the financial institution application responsive to an institution selection from the customer computing system.

* * * * *